United States Patent [19]
Didelot et al.

[11] Patent Number: 5,136,935
[45] Date of Patent: Aug. 11, 1992

[54] DEVICE FOR ASSEMBLY OF LAMINATED GLAZINGS BY PRESSING ROLLERS SUPPORTED BY JOINT SYSTEMS

[75] Inventors: Claude M. Didelot, Thourotte; Gilles M. Wattiau, Baboeuf, both of France

[73] Assignee: Saint-Gobain Vitrage International, Aubervilliers Cedex, France

[21] Appl. No.: 659,562

[22] Filed: Feb. 22, 1991

[30] Foreign Application Priority Data

Mar. 8, 1990 [FR] France ............................ 90 02922

[51] Int. Cl.$^5$ .......................... B30B 3/04; B32B 31/00
[52] U.S. Cl. .................. 100/155 G; 100/161; 100/170; 156/582
[58] Field of Search ....... 100/155 R, 155 G, 168–170, 100/172, 161; 156/102, 103, 581, 582

[56] References Cited

U.S. PATENT DOCUMENTS

| | | | |
|---|---|---|---|
| 2,340,933 | 2/1944 | Chilton | 100/155 G X |
| 2,376,494 | 5/1945 | Larabee | 100/161 X |
| 2,983,635 | 5/1961 | Richardson | 100/155 G X |
| 3,029,177 | 4/1962 | Boicey et al. | 100/155 G X |
| 3,071,066 | 1/1963 | Bodi et al. | 100/155 G X |
| 3,669,808 | 6/1972 | Klotzbach et al. | 100/155 G X |
| 4,696,713 | 9/1987 | Okafuji et al. | 100/155 G X |
| 4,701,240 | 10/1987 | Kraemer et al. | 100/155 G X |
| 4,788,911 | 12/1988 | Bishop et al. | 100/155 G |
| 4,988,398 | 1/1991 | Pereman et al. | 100/155 G X |

Primary Examiner—Harvey C. Hornsby
Assistant Examiner—Stephen F. Gerrity
Attorney, Agent, or Firm—Oblon, Spivak, McClelland, Maier & Neustadt

[57] ABSTRACT

A device for the assembly of a laminated glazing by pressing includes at last one unit of pressing rollers (3, 5) extending crosswise, and controlled by at least one unit of cylinders (19, 30). The pressing rollers are mounted at least in part in pairs (3a, 3b, 5a, 5b) on the rod of the same cylinder by a joint system (17, 28) making possible a relative movement of one roller in relation to the other in the direction of pressing.

11 Claims, 4 Drawing Sheets

DEVICE FOR ASSEMBLY OF LAMINATED GLAZINGS BY PRESSING ROLLERS SUPPORTED BY JOINT SYSTEMS

BACKGROUND OF THE INVENTION

1. Field of the Invention

This invention relates to the production of laminated glazings and in particular a device for the assembly of constituent elements of a laminated glazing by pressing, in particular by calendering, i.e., by pressing of the stack of said constituent elements, designated as glazings in the following description, between upper pressing means and lower pressing means.

2. Description of the Related Art

The known calendering devices, described for example in the publication of French patent 2 053 104, are generally equipped with two series of pressing rollers: a series of lower rollers placed beside one another, their position being adjusted independently so as to obtain a curvature corresponding to the desired crosswise curvature which is generally the mean curvature of the glazing, and a series of upper rollers placed approximately in the same way. In the known devices, the two series of rollers are each mounted on a crosswise beam belonging to a frame that can pivot around a horizontal pin, the whole constituting a mobile unit, so that the rollers remain approximately perpendicular to the glazing during the entire assembly operation.

During the passage of the glazing between the rollers, the position of these rollers must vary to follow the changes in the crosswise curvature of the glazing. For this purpose, a calender has already been proposed in the publication of European patent EP 0 189 345 that uses pneumatic cylinders that obtain a great flexibility for the rollers in following the curvature of the glazing. In this calender, of the type known as "floating," the compression chambers of the cylinders of the upper rollers and those of the cylinders of the lower rollers ar in communication and the pneumatic pressure being exerted on a pressure roller is equal to that being exerted on a counterpressure roller.

These devices are generally suited for the assembly of glazings exhibiting a crosswise bending that is smooth and not very accentuated and when this crosswise bending of the glazing is approximately the same over the entire length of the glazing. But for glazings having more complex shapes, particularly for glazings that exhibit a bending that is very deep in the crosswise section and/or irregular over the length of the glazing, these known devices are not always satisfactory because they are not flexible enough to be able to follow all the significant changes in curvature. If the pressure of the rollers is too low, an insufficient or not very homogeneous adhesion of the constituent elements of the glazings results and if the pressure is too great, breaks in the glazing result.

To increase the flexibility of the device, the applicant attempted using rollers of small width and increasing their number. But this causes the problem of increased bulk of the series of pneumatic cylinders placed beside one another in the vertical plane passing through the pressing line.

SUMMARY OF THE INVENTION

It is an object of the invention to obviate the above drawbacks by providing a device for the assembly of symmetric or asymmetric laminated glazings by pressing, able to operate both on glazings with double bending that are regular and not very accentuated and on glazings with complex shapes that can exhibit bendings that are very accentuated and/or irregular. By double bending is meant, according to the invention, a glazing exhibiting both a longitudinal curvature and a crosswise curvature. By symmetric glazings is meant, according to the invention, laminated glazings whose two faces consist of rigid sheets such as glass sheets. By asymmetric glazings is meant laminated glazings made of a monolithic or laminated rigid support and of a flexible plastic sheet having the desired properties, for example the asymmetric glazings described in the publications of French patent 2 398 606 and European patents 0 132 198 and 0 131 523.

The device according to the invention comprises at least one unit of pressing rollers that extends crosswise to the direction of glass movement and controlled by at least one unit of cylinders. The pressing rollers are mounted at least in pairs on the rod of the same cylinder by a joint system making possible a relative movement of one roller in relation to the other in the direction of pressing.

The mounting of two rollers on the same cylinder makes it possible to double the number of rollers for the same bulk of cylinders and thereby to increase the effectiveness of the pressing in the parts of the pressing line where the curvatures are very accentuated.

The two rollers actuated by the same cylinder can be mounted jointed on a parallelogram joint system, the rods carrying the two rollers constituting two parallel sides of the parallelogram, and being guided to remain parallel to one another and at the same distance from one another.

According to an embodiment of the device according to the invention, the two rollers actuated by the same cylinder are mounted at the end of two rods that are parallel to one another, themselves mounted at the end of the rod of the cylinder by the joint system, so that the action of the cylinder is located in the pressing plane.

In a variant, the two parallel rods of the two rollers are located in a plane that is different from the action plane of the rod of the cylinder, the action being transmitted by a lever attached to the connecting joint between the two rods of the rollers.

The mounting of two rollers that can be actuated by the same cylinder can be used for all the rollers that are part of the upper pressing unit and/or for all the rollers that are part of the lower pressing unit.

In a variant, only a part of the rollers consists of rollers mounted in pairs of rollers jointed to the end of the rod of the cylinders.

Mounting in pairs of rollers according to the invention can be used to equip a calender comprising an upper unit of pressing rollers and lower unit of pressing rollers.

This mounting in pairs can be used also according to the invention, to equip a calender comprising a flexible roller extending over the entire useful width of the assembly device or a roller which is curved to give it the desired curvature by a unit of upper rollers.

In this case, generally only the lower pressing rollers are mounted in pairs according to the invention.

Mounting in pairs ca be used also according to the invention for the upper rollers of an assembly device using a shape support as a lower pressing means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
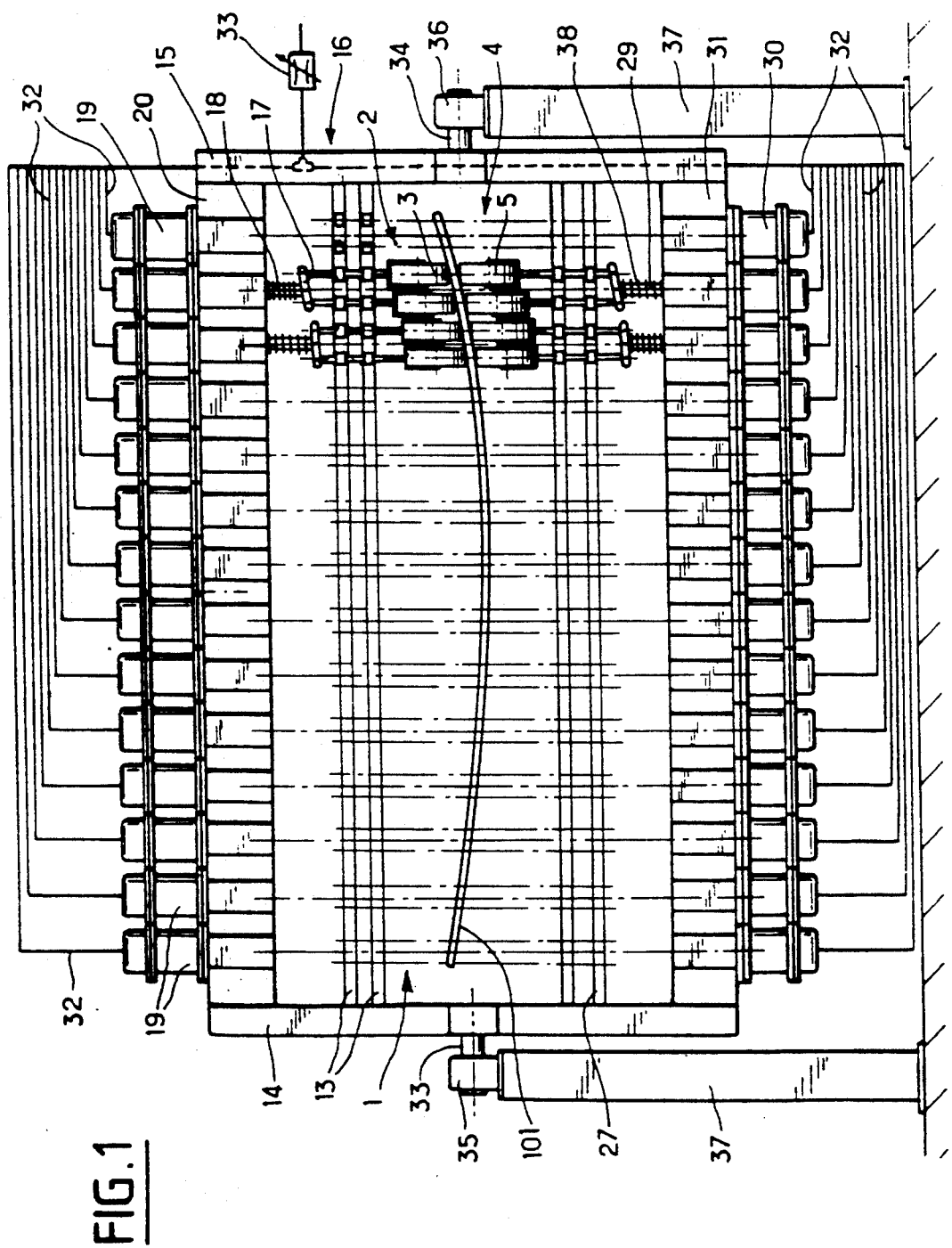
FIG. 1 shows in front elevation an embodiment of a device comprising a unit of upper pressing rollers and a unit of lower pressing rollers, these rollers being mounted in pairs and jointed to the end of the rod of the cylinders.
Figure 2:
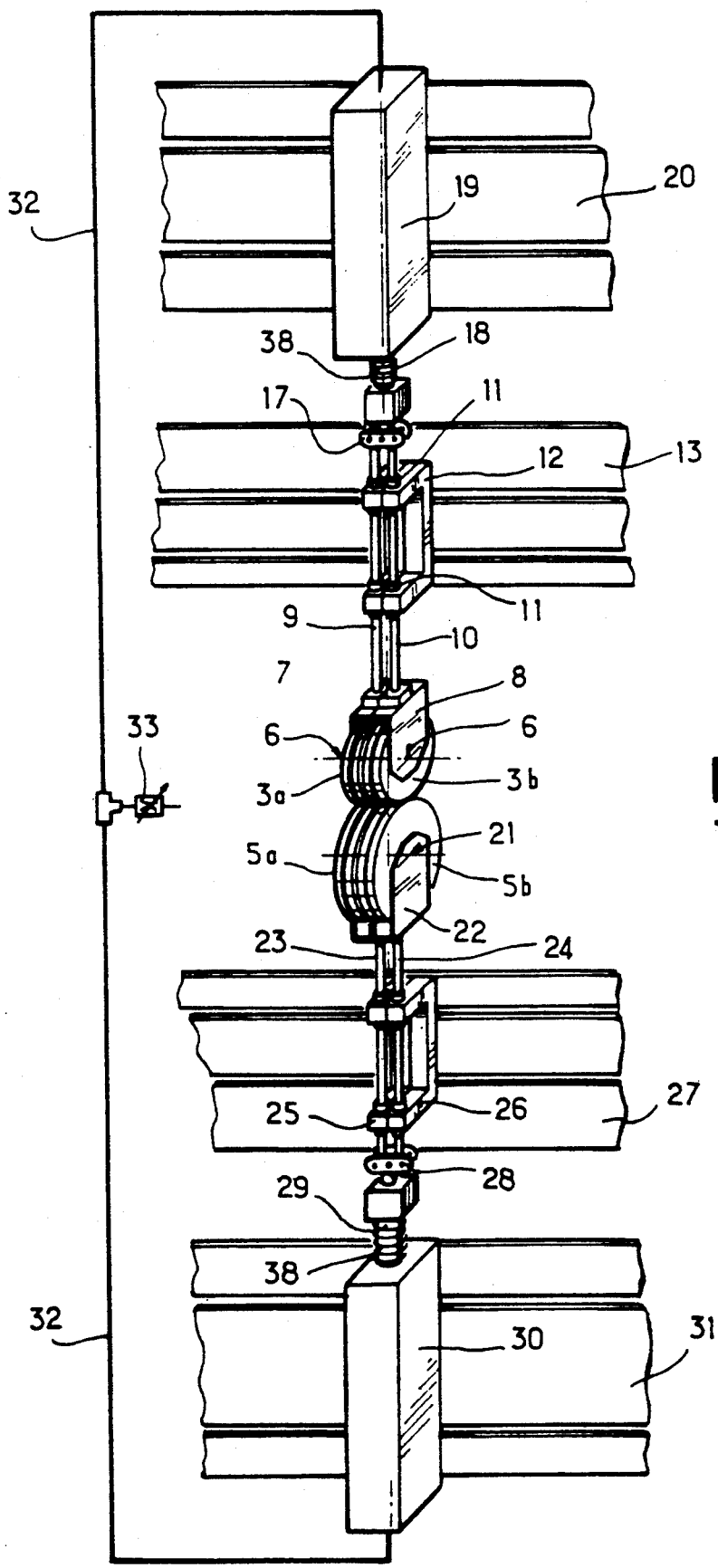
FIG. 2 shows the mounting of a pair of pressure rollers and of a pair of counterpressure rollers, controlled by two cylinders, whose pressure chambers are connected to one another.

The device shown in FIG. 1 and partially in FIG. 2 comprises a mobile unit 1 equipped with a unit 2 of upper pressing rollers 3 and with a unit 4 of lower pressing rollers 5 (all the rollers are not shown).

Upper rollers 3 are mounted in pairs (3a, 3b) around pins 6, carried by yokes 7, 8 placed at the end of rods 9, 10 guided vertically to slide in rings 11 carried by supports 12 fastened to a horizontal beam 13, extending between the two uprights 14, 15 of a frame 16 carrying mobile unit 1.

Rods 9, 10 carrying rollers 3 are associated in pairs by being attached to joints 17, themselves connected to rods 18 of cylinders 19. The joints 17 permit relative movement between rollers 3a and 3b, as described below. Cylinders 19 are fastened to an upper horizontal beam 20. Thus, the same cylinder acts on two neighboring rollers whose positions in depth in the direction of pressing can vary as a result of joint 17 connecting their rods. Thus, the number of rollers can be doubled for the same bulk of cylinders in the mobile unit.

Lower rollers 5 are mounted in the same way in pairs (5a, 5b) around pins 21 carried by yokes 22 placed at the end of rods 23, 24 guided vertically to slide in rings 25 carried by supports 26 fastened to a horizontal beam 27 extending between the two uprights 14, 15 of the frame carrying the mobile unit. The two rods 23, 24 of the rollers are associated in pairs and attached to joints 28 connected to rods 29 of lower cylinders 30. Lower cylinders 30 are fastened to a lower horizontal beam 31.

The cylinders used are advantageously pneumatic diaphragm cylinders as described in the publication of European patent EP 0 189 345. The pressure chambers of the cylinders actuating the upper rollers are connected by ducts 32 to the pressure chambers of the cylinders actuating the lower rollers that are opposite them. The pressure can be adjusted to the desired value by a valve 33 for each of the units working in opposition.

Mobile frame 16 is mounted on two horizontal shafts 33, 34 aligned to rotate in bearings 35, 36 carried by frame 37.

In an embodiment (not shown) of the device, a mounting of the horizontal shafts can be provided that makes possible a raising-lowering movement of the mobile frame in relation to the frame.

The unit of the lower rollers comprises at least one and generally at least two driving rollers driven in a transmission system by a motor (not shown). The motor is advantageously placed on the mobile frame at the desired position and thus participates in the balancing of the mobile unit.

To simplify the device, the driving roller or rollers can be mounted alone, or in pairs without joints, on the rods of the cylinders.

An advantageous device for driving the driving rollers of the calender is described for example in the French patent application 88 14742. This device comprises a stationary and nondeformable transmission shaft mounted on the mobile frame, connected to the motor unit by a chain or a belt and to each driving roller by a transmission system comprising a bevel gear and a jointed unit that is deformable in an essentially vertical direction. The deformable jointed unit is advantageously formed from an approximately vertical shaft comprising two universal joints and a splined shaft.

Around the rod of the cylinders, there can advantageously be provided, at least for the lower cylinders, a spring 38 between the body of the cylinder and the end of the rod to compensate for the weight of one of the two lower rollers and of the upper pressing element and or to maintain the rod of the cylinders at a desired length.

In a variant, it is possible to equip the lower cylinders with pneumatic springs such as those described in the publication of European patent EP 0 189 345.

Figure 3:
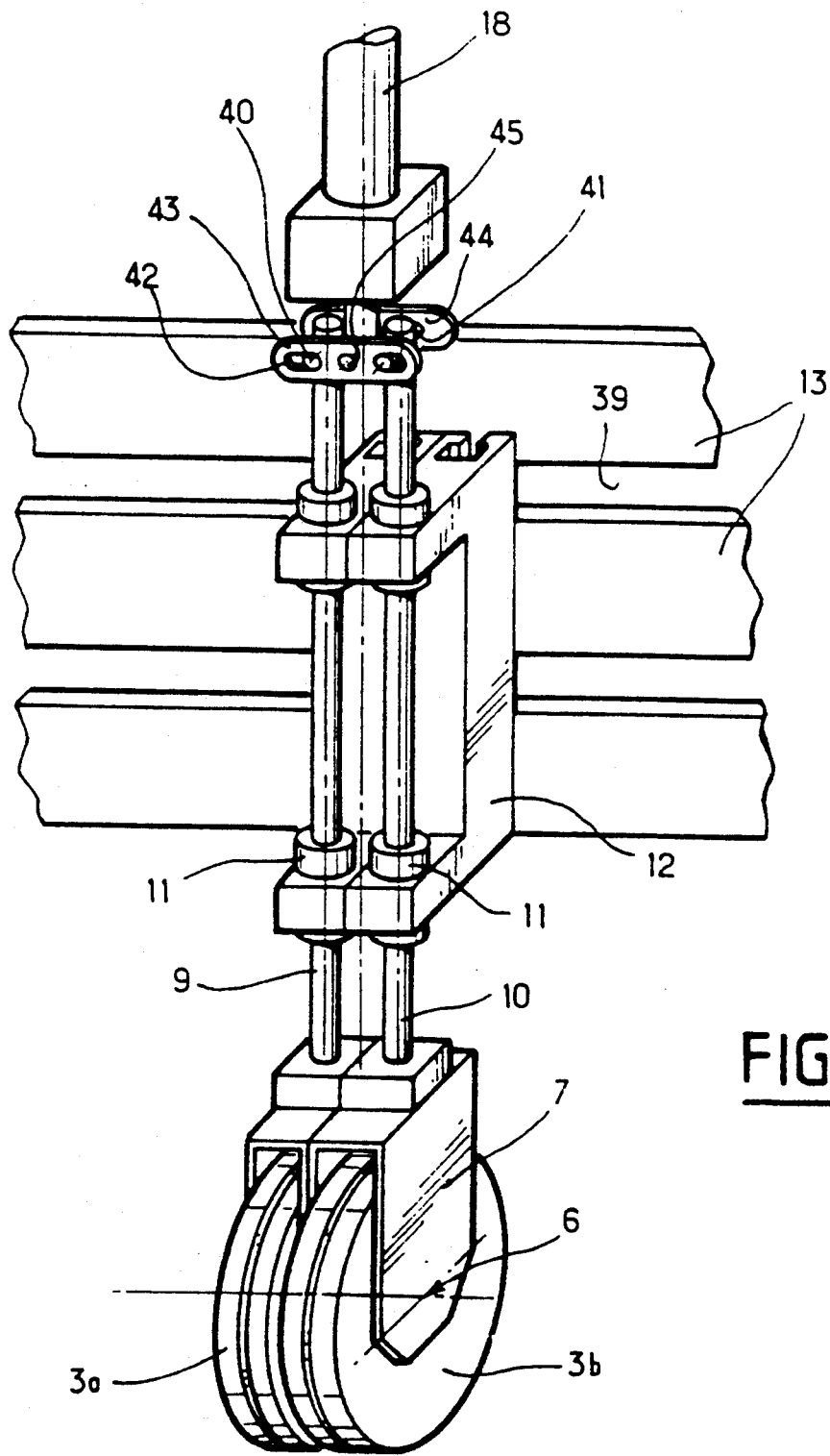
FIG. 3 shows the mounting of two rollers on the rod of a cylinder placed in the pressing plane as in the case of the device of FIG. 1.

In FIG. 3, the mounting according to the invention of a pair 3a, 3b of rollers 3 on rod 18 of a cylinder has been shown in greater detail.

The two parallel rods 9, 10 of the rollers are guided in rings 11, held by supports 12 whose positions can be adjusted by sliding on grooves 39 provided in beam 13. Two pins 40, 41 perpendicular to said rods are mounted to slide in oblong holes 42 of two connecting parts 43, 44 which pivot around a central pin 45 fastened on the lower end of rod 18 of the cylinder, pass through the upper ends of the two rods 9 and 10. The two rods 9, 10 of the rollers thus have a freedom of movement in relation to one another in the direction of pressing, so that the two rollers can press more effectively on a glazing 101 having an accentuated curvature.

The relative movement of one roller in relation to the other can be several centimeters.

Figure 4:
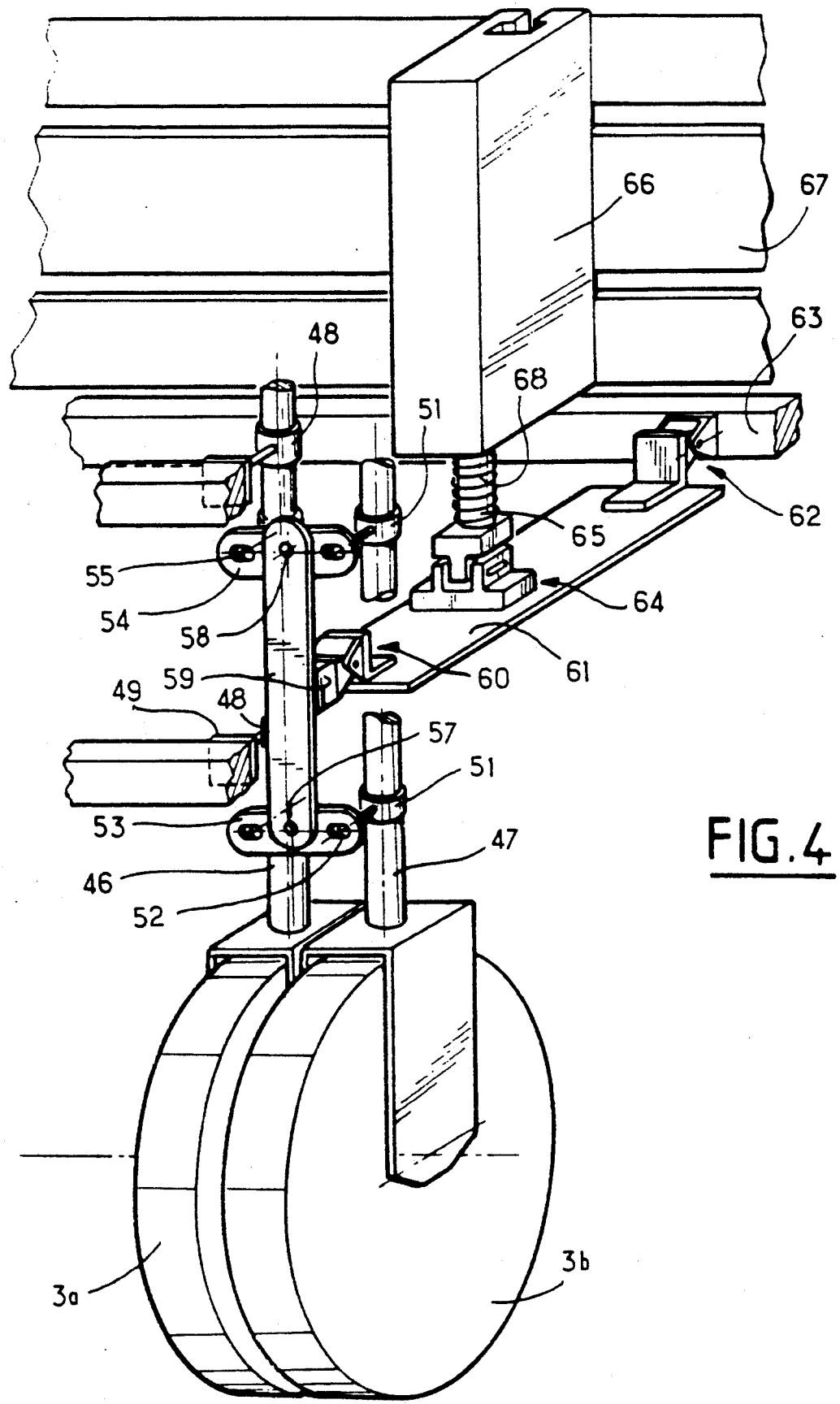
FIG. 4 shows the mounting of two rollers actuated by a cylinder, placed in a plane that is different from that of the pressing plane.

In FIG. 4 is shown a variant of a mounting according to the invention of a pair of rollers actuated by the same cylinder 66. In this variant, the body and the rod of the cylinder 66 are placed in a plane that is different from the pressing plane. The cylinder can be placed in a plane parallel to the pressing plane as shown in the Figure.

It is possible, according to another embodiment not shown, for the cylinders to be placed in a plane that is inclined in relation to the pressing plane.

In FIG. 4, the two rollers 3a, 3b are mounted at the end of two rods 46, 47 so as to slide vertically in rings 48 held by supports 49 fastened to a horizontal beam 50 belonging to the frame of the calender as in the embodiment described previously in relation to FIGS. 1, 2 and 3.

Other rings 51 integral with the rods 46 and 47 carry pins 52 extending perpendicular to said rods. These pins are carried by two connecting parts 53, 54 having oblong holes 55 in which said pins 52 can slide. The two connecting parts 53, 54 are connected by a vertical intermediate part 56 using two pins 57, 58 around which the connecting parts 53, 54 can pivot. On intermediate part 56 is mounted an attachment part 59 that connects with another part 60 carried by a lever 61 which is mounted by a joint system 62 on a horizontal crosspiece 63 belonging to the frame of the calender and which is also connected by another joint 64 to rod 65 of cylinder 66, itself mounted on beam 67. A spring 68 for maintaining the distance between the cylinder and the joint can be provided on the rod of the cylinder. Movement of the cylinder rod 65 moves the intermediate part 56 via the lever 61. This in turn moves the rollers 3a, 3b via the rings 51 and connecting parts 54, but with some movement differential permitted between the rollers, due to pivoting of the connecting parts.

This system of cylinder mounting outside the pressing plane can be advantageously used when the cylinders have a considerable bulk. Thus, it is possible to place the cylinders actuating the jointed pairs of rollers alternately by placing these cylinders in different planes, for example by distributing the cylinders of a pressing unit alternately in subunits, each subunit being placed in a different plane at least one of which is outside the pressing plane.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Device for the assembly of laminated glazings by pressing, comprising:
   a frame;
   at least one set of pressing rollers extending in a direction crosswise to a direction of movement of the glazings relative to the device;
   a plurality of joint systems supporting said rollers, each of said joint systems supporting at least two of the pressing rollers of each set of pressing rollers, wherein each said joint system includes means for permitting the pressing rollers supported thereby to move in a pressing direction independently of one another; and
   a drive cylinder supporting each of said joint systems, each of said drive cylinders being supported by the frame.

2. Device of claim 1 including a rod connected between each of said pressing rollers and the joint system supporting the respective pressing roller, including means for guiding all of said rods for parallel movement in the pressing direction.

3. Device of claim 2 wherein each of said drive cylinders lies in the same vertical plane as the pressing rollers supported thereby.

4. Device of claim 2 wherein each of said drive cylinders lies in a vertical plane offset, in the direction of movement of the glazings, from the pressing rollers supported thereby.

5. Device of claim 2 wherein all of said drive cylinders lie in a single vertical plane.

6. Device of claim 2 including both upper and lower ones of said sets of pressing rollers, and wherein said at least two pressing rollers supported by each said joint system comprise exactly two pressing rollers.

7. Device of claim 2 wherein the drive cylinders comprise pneumatic cylinders, including means for applying an equal pneumatic pressure to all of said drive cylinders.

8. Device of claim 2 wherein said frame is mounted to pivot about an axis parallel to said set of rollers.

9. Device of claim 2 including means for rotationally driving at least one of said rollers.

10. Device of claim 2 wherein each said joint system is a parallelogram joint system comprising at least one connecting part pivotally mounted relative to one of the drive cylinders and having ends pivoted to the rods, whereby pivoting of the connecting part produces said independent movement of the pressing rollers.

11. Device of claim 10 including a lever connected between each said joint system and a corresponding one of said drive cylinders.

* * * * *